(12) United States Patent
Troy (10) Patent No.: US 11,184,044 B2
(45) Date of Patent: Nov. 23, 2021

(54) ANTENNA DISTRIBUTION UNIT (71) Applicant: RF VENUE, INC., Ashland, MA (US)

(72) Inventor: Edward Sandford Troy, Doylestown, PA (US)

(73) Assignee: RF VENUE, INC., Ashland, MA (US)

(*) Notice: Subject to any disclaimer, the term of this patent is extended or adjusted under 35 U.S.C. 154(b) by 0 days.

(21) Appl. No.: 17/024,810

(22) Filed: Sep. 18, 2020

(65) Prior Publication Data
US 2021/0083703 A1 Mar. 18, 2021

Related U.S. Application Data (60) Provisional application No. 62/902,157, filed on Sep. 18, 2019.

(51) Int. Cl.
| | |
|---|---|
| H01Q 21/00 | (2006.01) |
| H01Q 3/00 | (2006.01) |
| H01Q 9/16 | (2006.01) |
| H01Q 1/50 | (2006.01) |
| H01Q 5/35 | (2015.01) |
| H04B 1/10 | (2006.01) |
| H04B 1/18 | (2006.01) |

(52) U.S. Cl.
CPC ............ *H04B 1/1081* (2013.01); *H01Q 5/35* (2015.01); *H04B 1/18* (2013.01)

(58) Field of Classification Search
None
See application file for complete search history.

(56) References Cited

U.S. PATENT DOCUMENTS

| | | | | |
|---|---|---|---|---|
| 6,239,747 B1* | 5/2001 | Kaminski | ............... | G01S 3/023 342/147 |
| 6,941,573 B1* | 9/2005 | Cowan | ................. | H04H 20/103 348/E7.049 |
| 6,992,638 B2* | 1/2006 | du Toit | ................... | H01Q 3/242 343/711 |
| 7,138,886 B2* | 11/2006 | Strull | ....................... | H03H 7/46 333/109 |
| 7,365,695 B2* | 4/2008 | Thomas | .................. | H01P 1/184 342/373 |
| 7,433,713 B2* | 10/2008 | Haskell | ..................... | H04B 7/10 455/562.1 |
| 7,450,066 B2* | 11/2008 | Haskell | .................... | H01Q 3/36 342/368 |

(Continued)

*Primary Examiner* — Tuan A Tran
(74) *Attorney, Agent, or Firm* — Kriegsman & Kriegsman (57) ABSTRACT An antenna distribution unit distributes an input RF signal comprised of multiple discrete antenna feeds to a plurality of electronic devices in communication therewith. The antenna distribution unit engages in three-way signal splitting across a pair of successive splitting stages in order to produce an even multiplicity of high-quality signals across nine output ports. By limiting signal splitting to two splitting stages and carefully selecting components to maintain series and parallel impedance, a high-fidelity output signal is produced having an essentially flat spectrum over the target frequency band. In particular, the antenna distribution unit is optimized for use in the distribution of signals within the TV VHF low band of 50 MHz to 88 MHz, the TV VHF high band of 175 MHz to 213 MHz, the TV UHF band of 470 MHz to 610 MHz, and the 900 band of 900 MHz to 1000 MHz.

13 Claims, 9 Drawing Sheets (56) References Cited

U.S. PATENT DOCUMENTS

| | | | | |
|---|---|---|---|---|
| 7,911,383 B2* | 3/2011 | Haskell | ............. | H01Q 21/0006 |
| | | | | 342/372 |
| 8,159,394 B2* | 4/2012 | Hayes | ................. | H01Q 21/205 |
| | | | | 342/368 |
| 8,836,593 B2 | 9/2014 | Crowley et al. | | |
| 9,252,485 B2* | 2/2016 | Haskell | ................ | H01Q 3/2694 |
| 10,211,529 B2* | 2/2019 | Haskell | ................ | H01Q 3/2694 |
| 10,498,415 B2* | 12/2019 | Parker | .................. | H04B 7/0691 |
| 10,594,043 B2* | 3/2020 | Pu | ......................... | H01Q 25/00 |
| 10,608,338 B2* | 3/2020 | Thoreback | ............... | H01Q 3/26 |
| 10,700,420 B2* | 6/2020 | Bisiules | ............. | H01Q 21/0006 |
| 10,950,936 B2* | 3/2021 | Thoreback | ........... | H04B 7/0617 |
| 11,005,163 B2* | 5/2021 | Zimmerman | .......... | H01Q 19/06 |
| 11,089,595 B1* | 8/2021 | Frigon | ................. | H04B 7/0408 |
| 2014/0375518 A1* | 12/2014 | Powell | ............... | H01Q 21/0006 |
| | | | | 343/816 |
| 2020/0154521 A1* | 5/2020 | Nguyen | ................ | H01Q 21/28 |
| 2020/0303811 A1* | 9/2020 | Saito | ................... | H01Q 13/0266 |
| 2020/0335866 A1* | 10/2020 | Wang | ....................... | H01Q 3/34 |

* cited by examiner

Fig. 2

Prior Art

ANTENNA DISTRIBUTION UNIT

CROSS-REFERENCE TO RELATED APPLICATIONS

The present application claims the benefit under 35 U.S.C. 119(e) to U.S. Provisional Patent Application No. 62/902,157, which was filed on Sep. 18, 2020 in the name of Edward Sandford Troy, the disclosure of which is incorporated herein by reference.

FIELD OF THE INVENTION

The present invention relates generally to antenna systems and, more particularly, to antenna distribution units for use in distributed antenna systems.

BACKGROUND OF THE INVENTION

In a distributed antenna system, a network of antennas is provided to collectively receive radio frequency (RF) signals transmitted within a designated geographic area in order to improve coverage quality and reliability. The feed from each of the network of antennas is then typically transmitted to a common source for processing. In this capacity, distributed antenna systems are utilized in a wide range of applications, from cellular communication systems to microphone systems used in performance venues, such as churches, concert arenas and the like.

Figure 1:
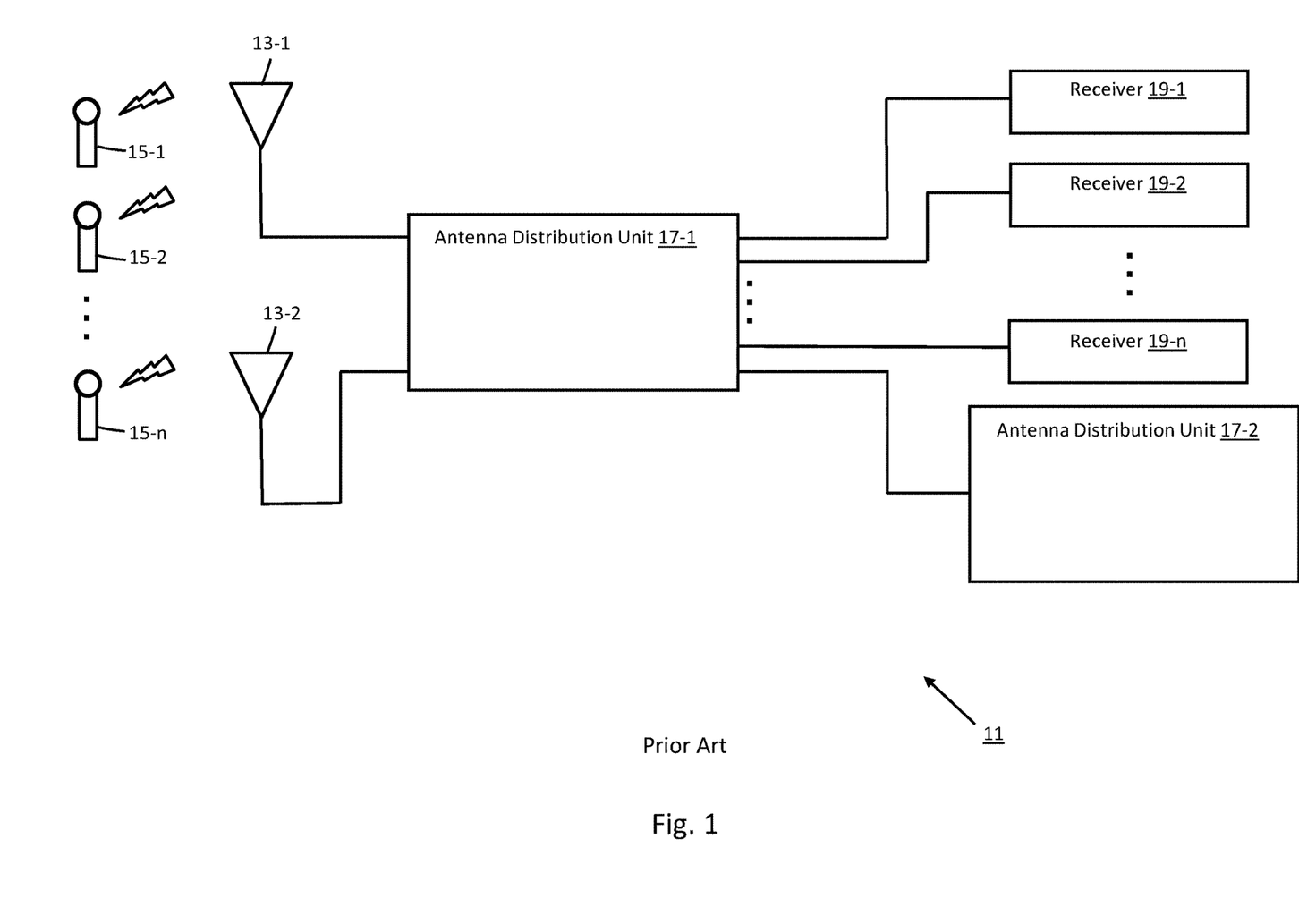
FIG. 1 is a system diagram of a distributed antenna system which is well known in the art.

Referring now to prior art FIG. 1, an example of a prior art distributed antenna system 11 is shown, system 11 being of the type which is particularly well suited for utilization as part of a microphone system. As can be seen, a network of antennas 13-1 and 13-2 provides coverage to an area in which a multitude of wireless microphones 15-1 thru 15-n are actively transmitting wireless signals. To preserve signal quality, each microphone 15 is preferably configured to transmit RF signals at a particular frequency channel within a designated frequency band.

The signal feed from each of antennas 13-1 and 13-2 is collected by a primary, or main, antenna distribution unit 17-1 in communication therewith. In turn, antenna distribution unit 17-1 distributes both signal feeds to a plurality of receivers 19-1 thru 19-n in communication therewith, wherein each receiver 19 is preferably tuned to the frequency channel for a corresponding microphone 15. In the present example, a secondary, or sub, antenna distribution unit 17-2 is shown connected to the output of main antenna distribution unit 17-1. In this manner, additional receivers can be coupled to the output of secondary unit 17-2 and thereby receive the antenna feeds. Accordingly, by cascading two or more units 17 in a daisy chain, a relatively large quantity of receivers 19 can be integrated into system 11.

Wireless communication systems of the type as described above which rely upon antenna diversity (i.e. the utilization of multiple antennas) have been found to achieve a number of notable advantages.

As a first advantage, distributed antenna systems of the type as described above have been found to achieve more reliable and higher quality signal transmission than systems configured without antenna diversity. For instance, a wireless microphone system with a non-diversity receiver (i.e. a receiver provided with a single antenna feed) is more susceptible to experiencing random drop-outs, noise, and/or other similar unwanted effects than systems with antenna diversity. Notably, in an antenna distribution system of the type as described above, a receiver is able to rapidly switch amongst the multiple antenna feeds upon detecting unwanted effects, thereby resulting in an overall improvement in signal quality with fewer drop-outs and noise.

As a second advantage, distributed antenna systems can often be constructed using less expensive antennas without sacrificing performance, since the redundancy in feeds allows for and resolves certain periodic unwanted effects, such as signal distortion, interference and the like.

Distributed antenna systems of the type as described above are often required to support a large number of receivers. One solution devised to support an increasing number of receivers is to cascade two or more units in a daisy chain, as referenced above in connection with distributed antenna system 11. However, it has been found that daisy chaining antenna distribution units typically adds noise as well as creates an increased risk of signal ingress (i.e. leakage) and pollution.

Accordingly, antenna distribution units are currently manufactured for sale with an increasing number of output ports (i.e., to support a commensurate number of receivers). For instance, in FIG. 2, a simplified electrical schematic of a prior art antenna distribution unit is shown, the antenna distribution unit being identified generally by reference number 51. As can be seen, unit 51 comprises an input connector 53 with a pair of ports 55-1 and 55-2, each port 55 being designated to receive the signal feed from a corresponding antenna. A signal combiner 55 in communication with the input connector 53 combines the two separate antenna feeds into a combined signal 57 which preserves the two discrete antenna feeds. As part of a first splitting stage, combined signal 57 is then split into two separate, yet equal, signals 59-1 and 59-2 by a signal splitter 61-1 in communication with signal combiner 55. Split signals 59-1 and 59-2 are then amplified in strength by amplifiers 63-1 and 63-2, respectively.

Figure 2:
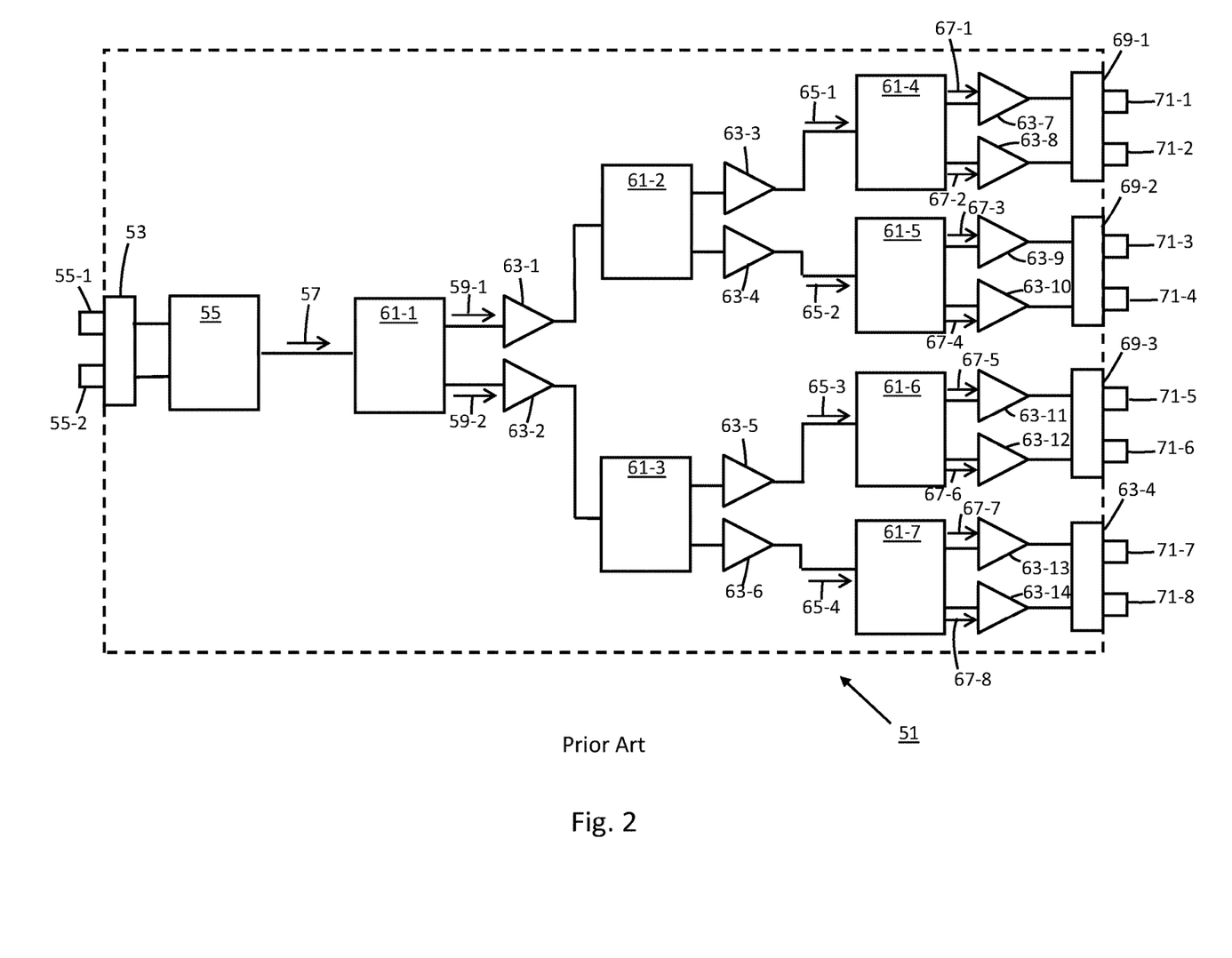
FIG. 2 is a simplified schematic representation of the antenna distribution unit shown in FIG. 1.

The amplified version of signals 59-1 and 59-2 are, in turn, split by signal splitters 61-2 and 61-3, respectively, as part of a second splitting stage. The split output signals from signal splitter 61-2 are then amplified in strength by amplifiers 63-3 and 63-4 to yield signals 65-1 and 65-2, respectively. Similarly, the split output signals from signal splitter 61-3 are amplified in strength by amplifiers 63-5 and 63-6 to yield signals 65-3 and 65-4, respectively.

As part of a third splitting stage, each of signals 65-1 thru 65-4 is further split by signal splitters 61-4 thru 61-7, respectively, to yield output signals 67-1 thru 67-8. Split output signals 67-1 thru 67-8 are then amplified in strength by amplifiers 63-7 thru 63-14, respectively, and in turn connected to corresponding dual-port output connectors 69-1 thru 69-4. Connectors 69 together provide eight separate output ports 71-1 thru 71-8 for unit 51. Configured as such, prior art unit 51 is capable of delivering two discrete antenna feeds to eight different receivers, with an even greater number of receivers being achievable if daisy chaining techniques are utilized.

However, conventional antenna distribution units which rely upon three successive splitting stages to create eight or more output ports (e.g., antenna distribution unit 51) suffer from certain notable shortcomings. In particular, the implementation of three successive splitting stages not only increases overall design complexity and manufacturing costs but also significantly lowers the quality of its output signal. More specifically, it has been found that the implementation of three successive splitting stages adds noise to the output signal and reduces its dynamic range. Additionally, the presence of intermodulation distortion (IMD) products, created by mixing the discrete feeds in a non-linear device, reduces the ability to use available bandpass from near adjacent microphone signals. As a result, conventional antenna distribution units are typically restricted for use within a significantly limited spectrum of the desired frequency band and, even within this limited spectrum, still produce unacceptable levels of noise artifacts and IMD products.

SUMMARY OF THE INVENTION

It is an object of the present invention to provide a novel antenna distribution unit for use in a distributed antenna system.

It is another object of the present invention to provide an antenna distribution unit as described above which is designed to distribute a signal comprised of two or more discrete antenna feeds to two or more electronic devices.

It is yet another object of the present invention to provide an antenna distribution unit as described above which distributes the signal with minimal noise and intermodulation distortion, high dynamic range, near constant impedance, and gain flatness.

It is still another object of the present invention to provide an antenna distribution unit as described above which distributes the signal within a usable frequency spectrum of broad bandwidth.

It is yet still another object of the present invention to provide an antenna distribution unit as described above which has a limited number of parts, is inexpensive to manufacture, and is easy to use.

Accordingly, as one feature of the present invention, there is provided an antenna distribution unit for distributing an input radio frequency (RF) signal to a plurality of electronic devices, the input RF signal comprising two or more discrete antenna feeds, the antenna distribution unit comprising (a) a single three-way splitter for splitting the input RF signal into first, second and third split signals as part of a first splitting stage, and (b) a splitter assembly coupled to the single three-way splitter, the splitter assembly comprising a set of three-way splitters for splitting each of the first, second and third split signals into three separate output signals as part of a second splitting stage.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings, wherein like reference numerals represent like parts.

DETAILED DESCRIPTION OF THE INVENTION

Distributed Antenna System 111

Figure 3:
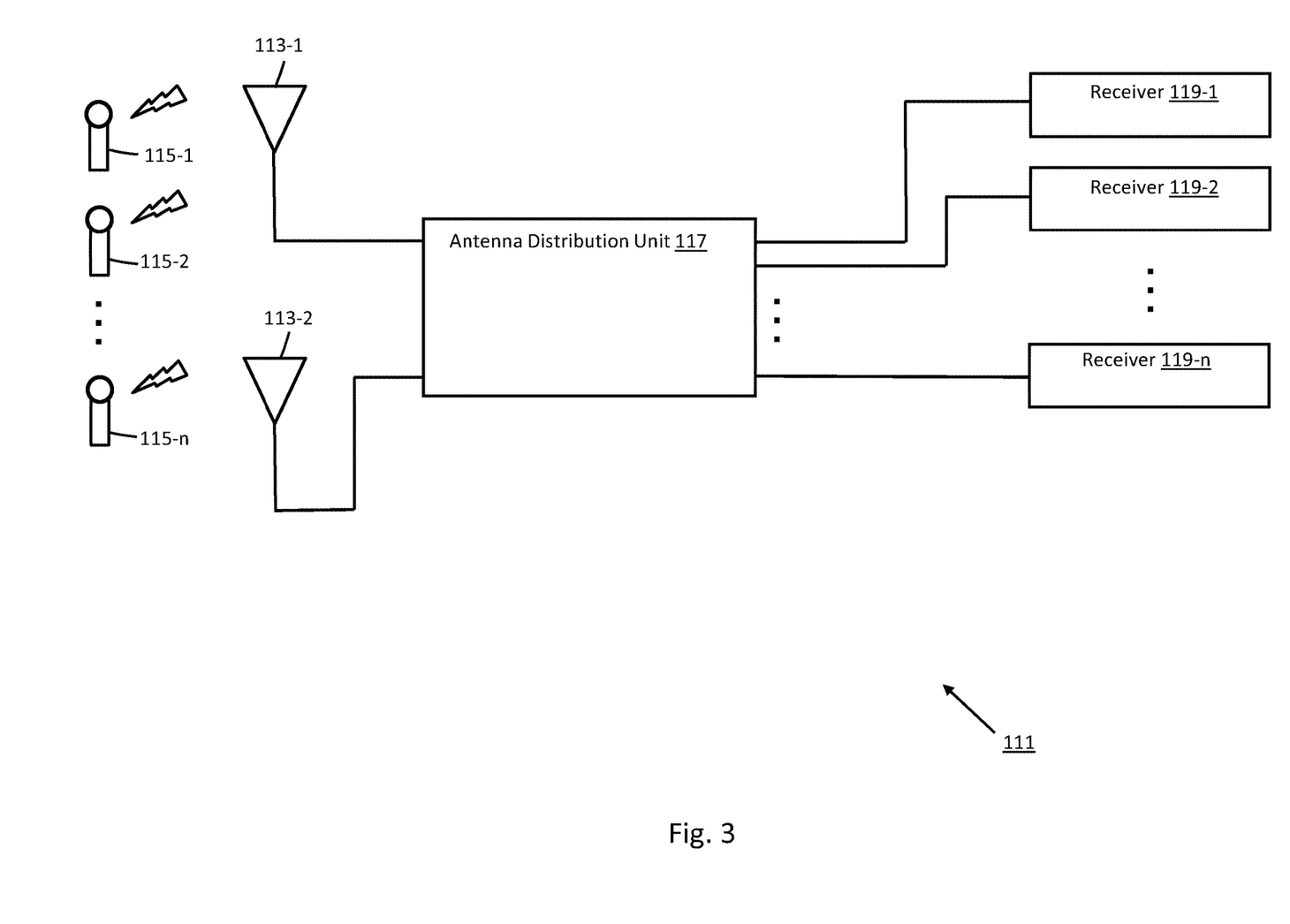
FIG. 3 is a system diagram of a distributed antenna system constructed according to the teachings of the present invention.

Referring now to FIG. 3, there is shown a distributed antenna system constructed according to the teachings of the present invention, the system being defined generally by reference numeral 111. As will be explained in detail below, system 111 is designed with a novel means for distributing a radio frequency (RF) signal to a plurality of electronic devices with high fidelity and within a reliable frequency spectrum of notably broad bandwidth.

As can be seen, distributed antenna system 111 is similar to prior art system 11 in that system 111 comprises a network of antennas 113-1 and 113-2 that together provides coverage to an area in which RF signals are being transmitted. For purposes of simplicity, a pair of antennas 113 is shown. However, it is to be understood that the number, type and configuration of antennas 113 are preferably dependent upon the designated application and could be varied, as needed, without departing from the spirit of the present invention. For instance, each of antennas 113 may of the type disclosed in U.S. Pat. No. 8,836,593 to R. J. Crowley et al., the disclosure of which is incorporated herein by reference.

As referenced above, antennas 113 are designed to receive RF signals transmitted within a designated area. In the present example, antennas 113 are depicted receiving RF signals from a multitude of wireless microphones 115-1 thru 115-n, with each microphone 115 preferably configured to transmit RF signals at a particular frequency channel within a designated frequency band to preserve signal quality.

However, it should be noted that system 111 is not limited for use as part of a microphone system. Rather, it is to be understood system 111 could be utilized to distribute any type of wireless signal derived through antenna diversity without departing from the spirit of the present invention.

The two discrete antenna feeds derived from antennas 113-1 and 113-2 are collected by an antenna distribution unit 117 in communication therewith. In turn, antenna distribution unit 117 distributes both signal feeds to a plurality of receivers 119-1 thru 119-n in communication therewith, each receiver 119 being preferably tuned to the frequency channel for a corresponding microphone 115.

Although not shown herein, it is to be understood that a secondary, or sub, antenna distribution unit could be connected to the output of main antenna distribution unit 117. Accordingly, by cascading two or more antenna distribution units in a daisy chain, a relatively large quantity of receivers could be integrated into system 111. However, because cascading multiple antenna distribution units in a daisy chain has been found to significantly degrade signal quality, such a configuration is not shown herein.

Distributed antenna system 111 differs from distributed antenna system 11 primarily in the manner that unit 117 distributes the discrete antenna feeds from antennas 113 to receivers 119. More specifically, unit 117 engages in three-way signal splitting across a pair of successive splitting stages in order to produce an even multiplicity of high-quality signals across the requisite number of output ports. Accordingly, it is to be understood that the electronic circuit architecture of antenna distribution unit 117 serves as the principal novel feature of the present invention and, as such, is set forth in greater detail below.

Antenna Distribution Unit 117

Figure 4:
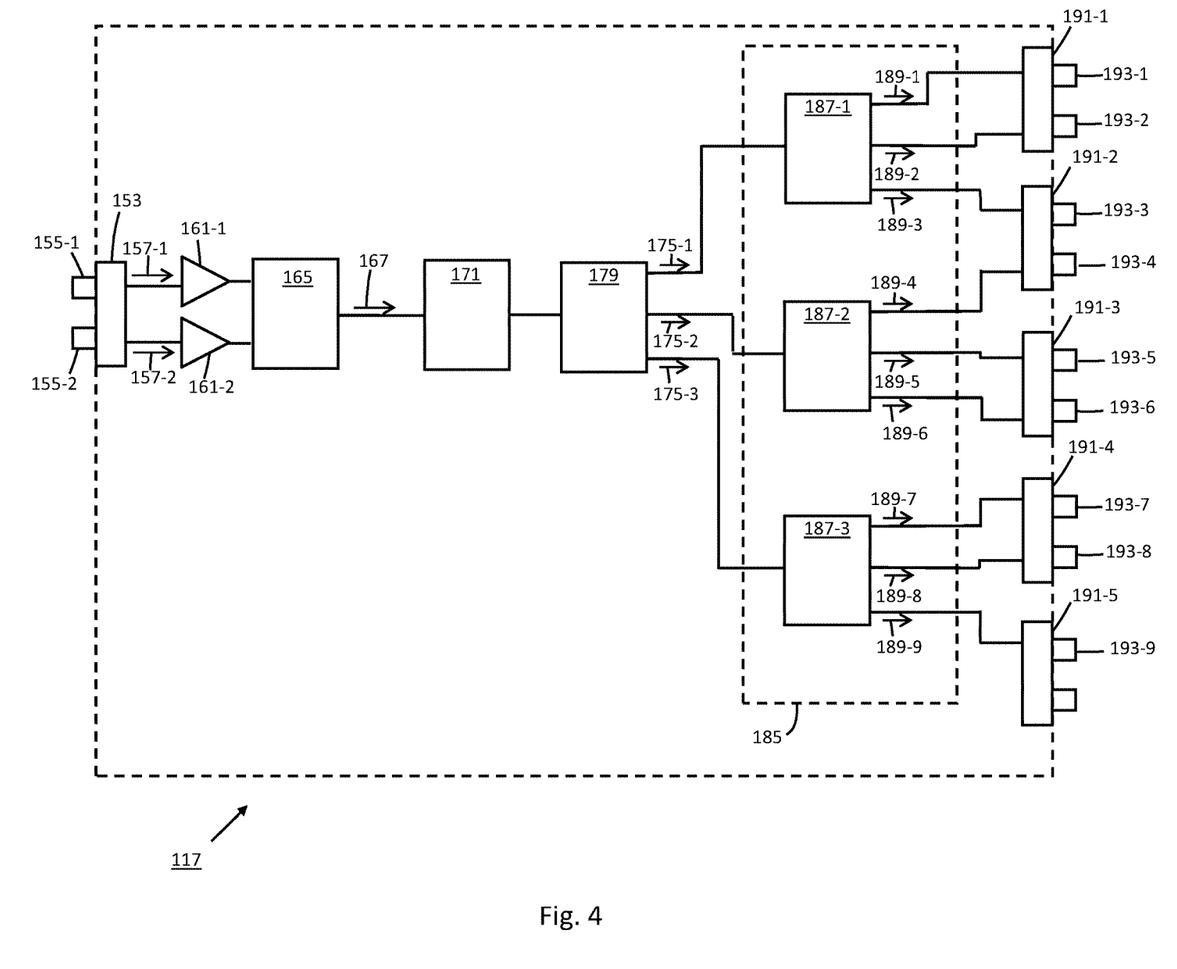
FIG. 4 is a simplified schematic representation of the antenna distribution unit shown in FIG. 3.

Referring now to FIG. 4, a simplified electrical schematic of antenna distribution unit 117 is shown. As referenced above, antenna distribution unit 117 is designed to engage in three-way signal splitting across a pair of successive splitting stages in order to produce an even multiplicity of high-quality signals across the requisite number of output ports. By (i) restricting signal splitting to only two splitting stages and (ii) maintaining series and parallel impedance, an output signal is produced having an essentially flat spectrum over the target frequency band, which is highly desirable. More specifically, antenna distribution unit 117 is optimized for use in the distribution of signals within the following target frequency bands: (i) TV VHF low band of 50 MHz to 88 MHz, (ii) TV VHF high band of 175 MHz to 213 MHz, (iii) TV UHF band of 470 MHz to 610 MHz, and (iv) 900 band of 900 MHz to 1000 MHz, wherein signals produced within the target frequency bands maintain excellent fidelity, gain flatness (in the range from −5 db to +5 db), high dynamic range (over 70 db), a third-order intercept point (IP3) of 20 db or better, and a voltage standing wave ratio (VSWR) that is generally no greater than 1.5:1.

As can be seen, unit 117 comprises an input connector 153 with a pair of ports 155-1 and 155-2, each port 155 being designated to receive a signal feed from a corresponding antenna. Preferably, input connector 153 is in the form of a 50 ohm, dual-port, Bayonet Neill-Concelman (BNC) connector. As will be explained further below, matching the impedance of input connector 153 with the characteristic impedance of the transmission line reduces the degree of signal reflection and thereby the minimizes the voltage standing wave ratio (VSWR) for unit 117, which is highly desirable.

Each of the pair of signal feeds 157-1 and 157-2 is amplified in strength by amplifiers 161-1 and 161-2, respectively. Preferably, each amplifier 161 exhibits flat gain, and produces low noise and minimal intermodulation distortion products. For instance, amplifier 161 may be in the form of a model ADL5535 amplifier manufactured by Analog Devices, Inc., of Norwood, Mass.

A signal combiner 165 in communication with amplifiers 161 combines the amplified version of signal feeds 157 into a combined input signal 167 which preserves the two discrete antenna feeds. Signal combiner 165 preferably exhibits optimal performance characteristics and may be in the form of, inter alia, a model TCP-2-10X+ power splitter/combiner manufactured by Mini-Circuits of Brooklyn, N.Y.

An RF directional coupler 171 in communication with combiner 165 conditions combined signal 167 for subsequent signal splitting processes. Coupler 171 preferably exhibits optimal performance characteristics and may be in the form of, inter alia, a model CX3099NL RF directional coupler manufactured by Pulse Electronics Corporation of Bristol, Pa.

As part of a first splitting stage, the conditioned version of combined signal 167 is split into three separate, yet equal, signals 175-1, 175-2, and 175-2 by a three-way, RF signal splitter 179 in communication with RF directional coupler 171. RF signal splitter 179 preferably exhibits optimal performance characteristics and may be in the form of, inter alia, a model SCA-3-11+ power splitter/combiner manufactured by Mini-Circuits of Brooklyn, N.Y.

As will be explained further below, the present invention uniquely recognizes that any signal loss (e.g., 1.5 db) created from the three-way splitting of signal 167 can be compensated for by restricting the three-way splitting process to only two splitting stages. Therefore, an input signal can be distributed to the requisite number of output ports (e.g., 8 or 9 output ports) without compromising overall signal quality. In fact, it has been found that the electronic circuit architecture of antenna distribution unit 117 significantly outperforms conventional antenna distribution units that utilize two-way signal splitters, which typically exhibit lower signal loss, because the use of two-way signal splitters requires three splitting stages, which cumulatively degrades the overall signal quality to an unacceptable level.

As part of a second splitting stage, a splitter assembly 185 is coupled to the output of three-way splitter 179 and splits each of signals 175-1, 175-2, and 175-3 three additional ways. More specifically, splitter assembly 185 comprises (i) a first, three-way, RF signal splitter 187-1 which splits signal 175-1 three ways to yield output signals 189-1, 189-2, and 189-3, (ii) a second, three-way, RF signal splitter 187-2 which splits signal 175-2 three ways to yield output signals 189-4, 189-5, and 189-6, and (iii) a third, three-way, RF signal splitter 187-3 which splits signal 175-3 three ways to yield output signals 189-7, 189-8, and 189-9. It is to be understood that each three-way RF signal splitter 187 may be identical in construction to splitter 179.

The outputs from splitter assembly 185 are coupled to five separate, dual-port, output connectors 191-1 thru 191-5. More specifically, output connector 191-1 is connected to splitter 187-1 so as to receive output signals 189-1 and 189-2, output connector 191-2 is connected to splitters 187-1 and 187-2 so as to receive output signals 189-3 and 189-4, respectively, output connector 191-3 is connected to splitter 187-2 so as to receive output signals 189-5 and 189-6, output connector 191-4 is connected to splitter 187-3 so as to receive output signals 189-7 and 189-8, and output connector 191-5 is connected to splitter 187-3 so as to receive output signal 189-9.

Each output connector 191 is preferably identical in construction to input connector 153. Accordingly, by matching the impedance of output connector 191 with the characteristic impedance of the transmission line, the degree of signal reflection is significantly reduced, thereby minimizing the voltage standing wave ratio (VSWR) for unit 117.

Connectors 191 together provide nine separate output ports 193-1 thru 193-9 for unit 117. Configured as such, unit 117 is capable of delivering two discrete antenna feeds to nine different receivers, with an even greater number of receivers being achievable if daisy chaining techniques are utilized.

As referenced above, the electronic circuit architecture for antenna distribution unit 117 relies upon three-way signal splitting across a pair of successive splitting stages in order to produce an even multiplicity of high-quality signals across the requisite number of output ports 193. It has been found that by, inter alia, (i) restricting signal splitting to only two splitting stages, and (ii) maintaining series and parallel impedance through the careful selection of components, an output signal 189 is produced having an essentially flat spectrum over the target frequency band, which is highly desirable.

In fact, the electronic circuit architecture of antenna distribution unit 117 significantly outperforms conventional antenna distribution units that utilize two-way signal splitters, which typically exhibit lower signal loss, because the use of two-way signal splitters requires three splitting stages, which cumulatively degrades the signal quality to an unacceptable level. Notably, antenna distribution unit 117 is optimized for use in the distribution of signals within the following target frequency bands: (i) TV VHF low band of 50 MHz to 88 MHz, (ii) TV VHF high band of 175 MHz to 213 MHz, (iii) TV UHF band of 470 MHz to 610 MHz, and (iv) 900 band of 900 MHz to 1000 MHz. Signals produced within the target frequency bands maintain excellent fidelity, gain flatness (in the range from −5 db to +5 db), high dynamic range (over 70 db), a third-order intercept point (IP3) of 20 db or better, and a voltage standing wave ratio (VSWR) which is largely no greater than 1.5:1.

Actual Test Results Achieved Using Unit 117 in Relation to a Comparative Unit

It should be noted that antenna distribution unit 117 was constructed in the manner set forth in detail above and, in turn, tested to determine its effectiveness in distributing an input test signal. For comparative purposes, a conventional antenna distribution unit (namely, a model UA844+SWB antenna distribution system manufactured by Shure Incorporated of Niles, Ill., which is hereinafter referred to simply as the comparative unit) was tested to determine its effectiveness in distributing the same input test signal. The results of the aforementioned testing is detailed below. The following results are provided for illustrative purposes only and are not intended to limit the scope of the present invention.

Figure 5A:
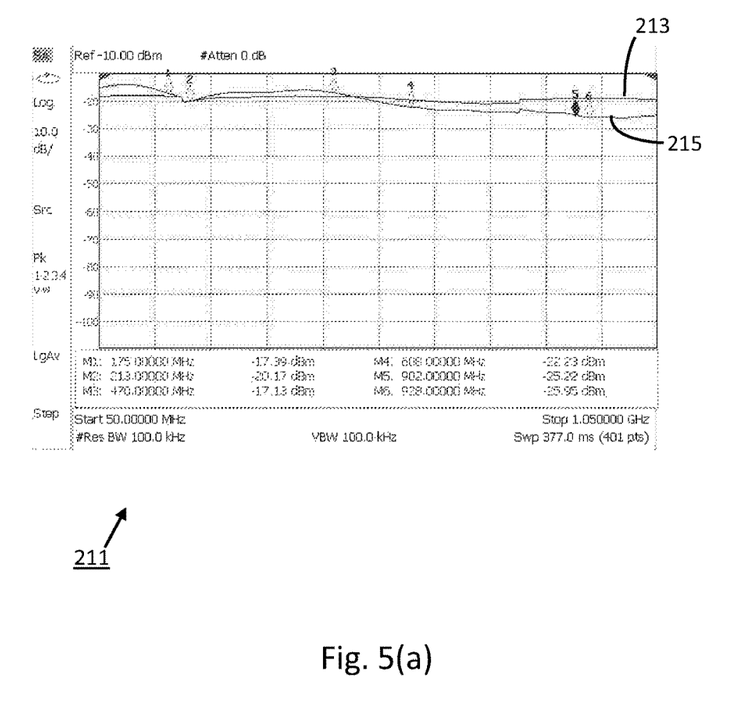
FIGS. 5(a) and 5(b) are graphs of actual measurements of the frequency response for the antenna distribution unit shown in FIG. 4 in comparison to a conventional antenna distribution unit of the type shown in FIG. 2, respectively, the graphs together illustrating the improvement in frequency response that is achieved by the present invention.
Figure 5B:
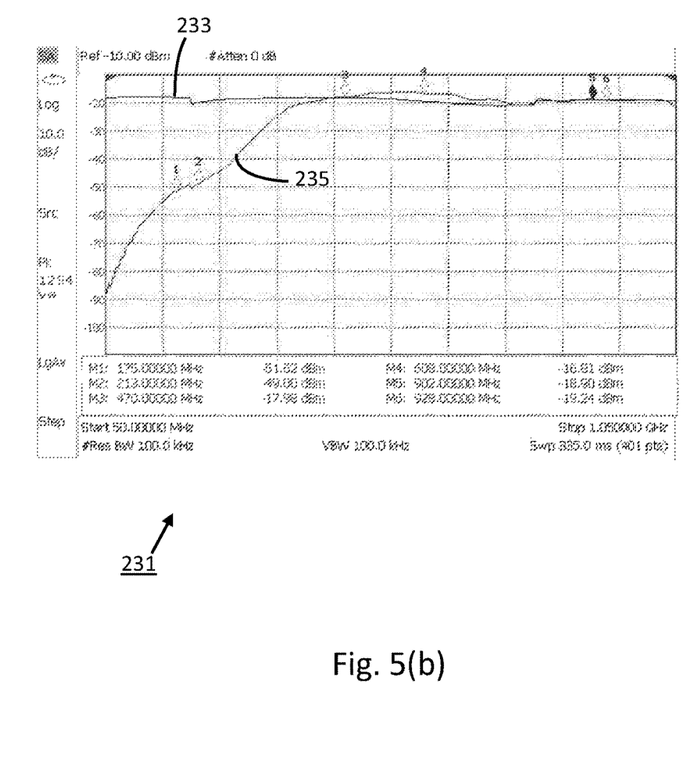

FIGS. 5(a) and 5(b) are actual graphs which illustrate frequency response achieved using antenna distribution unit 117 and the comparative unit, respectively. Together, the aforementioned graphs illustrate an increase in usable bandwidth achieved by the present invention.

Specifically, in FIG. 5(a), a graph for antenna distribution unit 117 is shown, the graph being identified generally by reference numeral 211. In graph 211, the frequency response of a test input signal 213 is represented in terms of gain (db) in view of frequency (MHz). As can be seen, unit 117 produces an output signal 215 with a frequency response which exhibits gain flatness within +/−5 db in any band segment of the entire bandwidth shown herein (50 MHz to 1050 MHz). In this capacity, it is to be understood that antenna distribution unit 117 is effective in distributing input signal 213 with acceptable gain flatness in both the VHF and UHF frequency bands.

By comparison, in FIG. 5(b), a graph for the comparative unit is shown, the graph being identified generally by reference numeral 231. In graph 231, the frequency response of a test input signal 233, identical to test signal 213, is represented in terms of gain (db) in view of frequency (MHz). However, as can be seen, the comparative unit produces an output signal 235 with a frequency response which exhibits gain flatness within +/−5 db in only a limited segment of the entire bandwidth shown herein (50 MHz to 1050 MHz). More specifically, the comparative unit is only effective in distributing input signal 233 with acceptable gain flatness within the frequency band from approximately 450 MHz to 1050 MHz. For frequency bands below 450 MHz, the comparative unit is ineffective in distributing input signal 233 with an acceptable level of gain flatness. As such, it is clear that the comparative unit is precluded from channel use within the entire VHF frequency band (30-300 MHz), thereby restricting its use to the UHF frequency band.

Figure 6A:
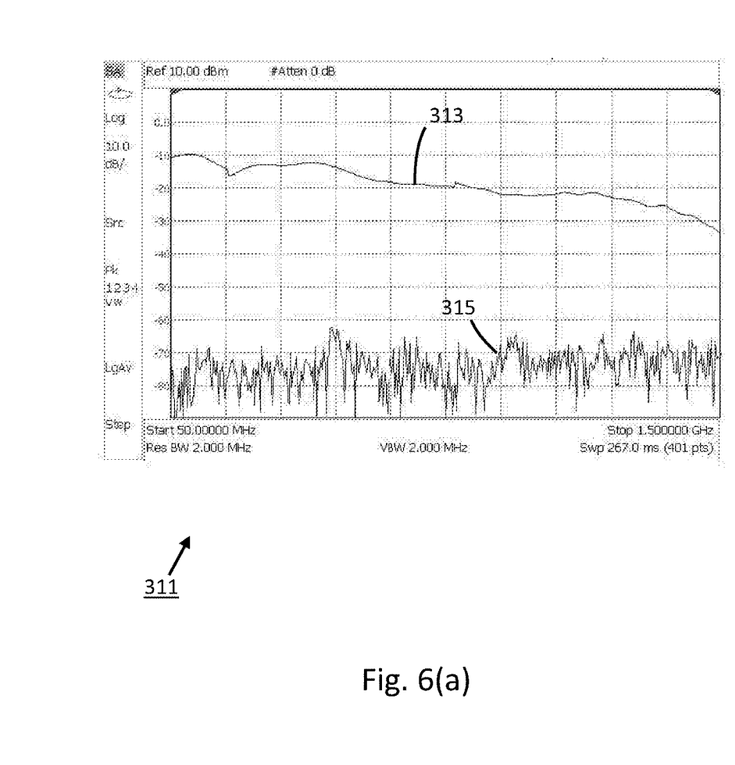
FIGS. 6(a) and 6(b) are graphs of actual measurements of A to B isolation for the antenna distribution unit shown in FIG. 4 in comparison to a conventional antenna distribution unit of the type shown in FIG. 2, respectively, the graphs together illustrating the improvement in power attenuation that is achieved by the present invention.
Figure 6B:
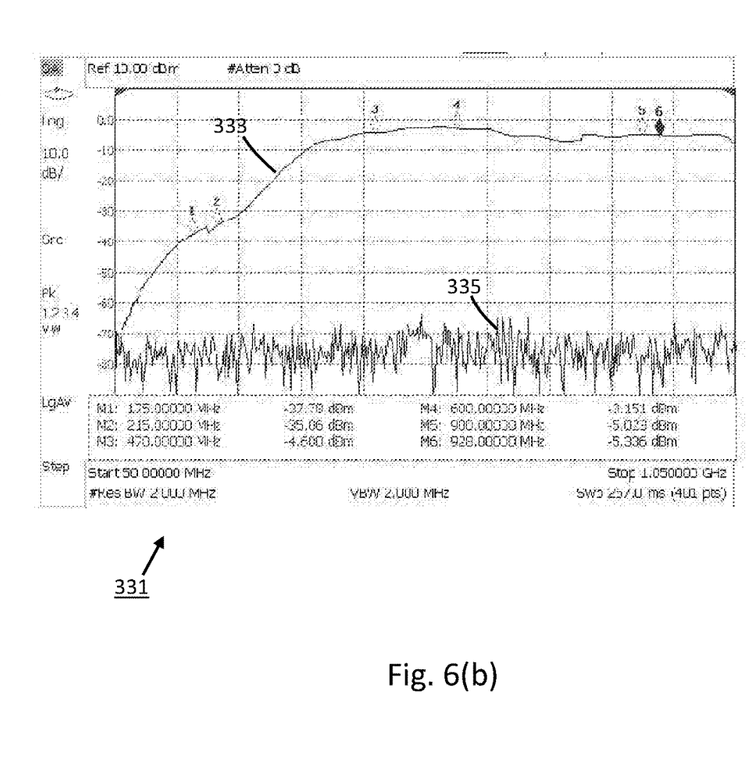

FIGS. 6(a) and 6(b) are actual graphs which illustrate A to B isolation resulting from attenuation in power between output ports due to the use of passive splitting devices in both antenna distribution unit 117 and the comparative unit, respectively. Together, the aforementioned graphs illustrate an improvement in power attenuation within the VHF frequency band that is achieved by the present invention.

Specifically, in FIG. 6(a), a graph for antenna distribution unit 117 is shown, the graph being identified generally by reference numeral 311. In graph 311, an A to B isolation measurement 313 is taken at output side A using the same input signal referenced above (i.e. signal 213), measurement 313 being represented in terms of gain (db) in view of frequency (MHz). Additionally, an A to B isolation measurement 315 is taken at output side B using the same input signal referenced above. As can be seen, unit 117 maintains an acceptable level of A/B isolation (−20 dBm) throughout most of the bandwidth shown herein (50 MHz to 1050 MHz).

By comparison, in FIG. 6(b), a graph for the comparative unit is shown, the graph being identified generally by reference numeral 331. In graph 331, an A to B isolation measurement 333 is taken at output side A using the same input signal referenced above, measurement 333 being represented in terms of gain (db) in view of frequency (MHz). Additionally, an A to B isolation measurement 335 is taken at output side B using the same input signal referenced above. As can be seen, the comparative unit experiences a general worsening level of A/B isolation in frequency bands below 450 MHz.

Figure 7A:
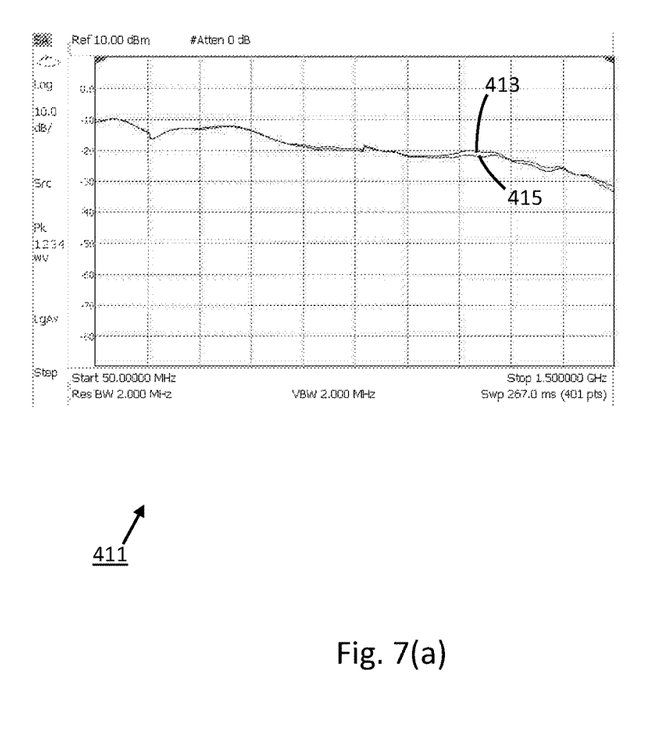
FIGS. 7(a) and 7(b) are graphs of actual measurements of a pair of output signals produced by the antenna distribution unit shown in FIG. 4 in comparison to a conventional antenna distribution unit of the type shown in FIG. 2, respectively, the graphs together illustrating the improvement in minimizing output signal variance that is achieved by the present invention.
Figure 7B:
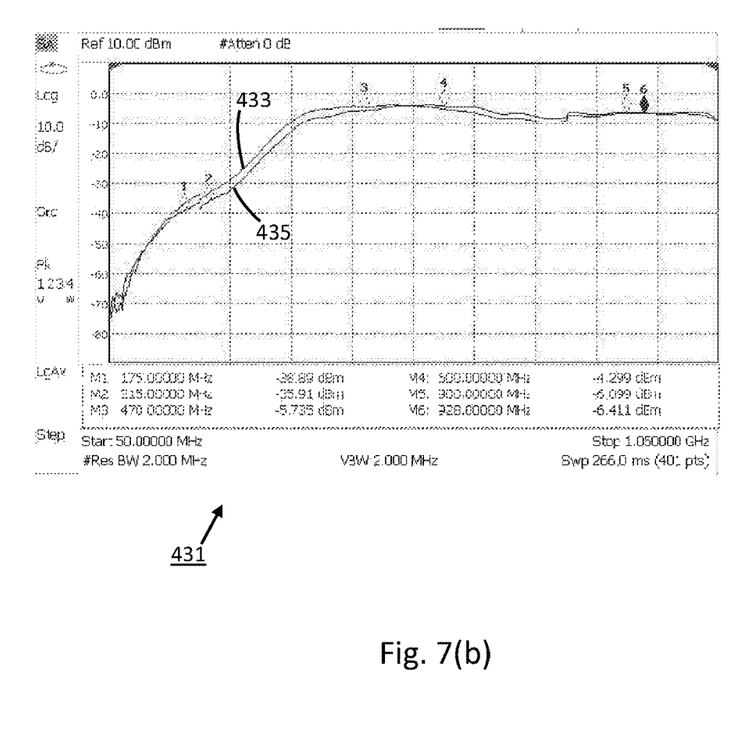

FIGS. 7(a) and 7(b) are actual graphs which illustrate variances between output signals generated by both antenna distribution unit 117 and the comparative unit, respectively. Together, the aforementioned graphs illustrate an improvement in minimizing output signal variance that is achieved by the present invention.

Specifically, in FIG. 7(a), a graph for antenna distribution unit 117 is shown, the graph being identified generally by reference numeral 411. In graph 411, an output signal measurement 413 is taken from one of its output ports (port 193-1) using the same input signal referenced above, measurement 413 being represented in terms of gain (db) in view of frequency (MHz). Additionally, a second output signal measurement 415 is taken from another of its output ports (193-9) using the same input signal referenced above. As can be seen, unit 117 produces negligible variance in strength between its output signals.

By comparison, in FIG. 7(b), a graph for the comparative unit is shown, the graph being identified generally by reference numeral 431. In graph 431, an output signal measurement 433 is taken from one of its output ports (port 71-1) using the same input signal referenced above, measurement 433 being represented in terms of gain (db) in view of frequency (MHz). Additionally, a second output signal measurement 435 is taken from another of its output ports (71-8) using the same input signal referenced above. As can be seen, the comparative unit experiences a greater variance in strength between its output signals, particularly in frequency bands below 450 MHz.

Figure 8A:
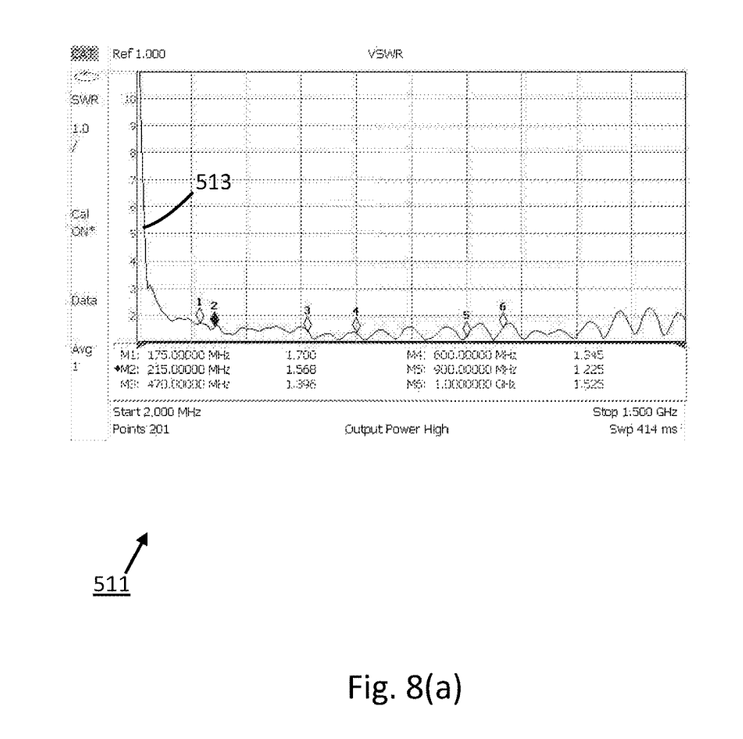
FIGS. 8(a) and 8(b) are graphs of actual measurements of the voltage standing wave ratio produced by the antenna distribution unit shown in FIG. 4 in comparison to a conventional antenna distribution unit of the type shown in FIG. 2, respectively, the graphs together illustrating the improvement in voltage standing wave ratio that is achieved by the present invention.
Figure 8B:
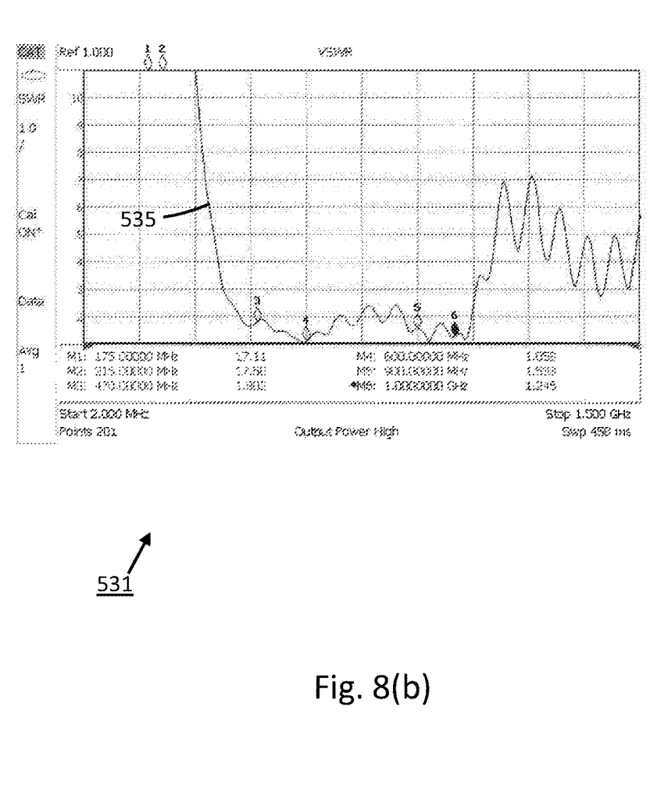

FIGS. 8(a) and 8(b) are actual graphs which illustrate the voltage standing wave ratio (reflecting the degree of load and source impedance matching) measured in both antenna distribution unit 117 and the comparative unit, respectively. Together, the aforementioned graphs illustrate a significant improvement in the voltage standing wave ratio (VSWR) that is achieved by the present invention.

Specifically, in FIG. 8(a), a graph for antenna distribution unit 117 is shown, the graph being identified generally by reference numeral 511. In graph 511, a VSWR measurement 513 is taken at one of its input ports (port 155-1) across a frequency band from 2.0 MHz to 1.5 GHz. As can be seen, unit 117 maintains a voltage standing wave ratio of approximately 1.5:1 throughout most of the above-identified frequency band.

By comparison, in FIG. 8(b), a graph for the comparative unit is shown, the graph being identified generally by reference numeral 531. In graph 531, a VSWR measurement 535 is taken at one of its input ports (55-1) across the same frequency band of 2.0 MHz to 1.5 GHz. As can be seen, the comparative unit experiences a greater voltage standing wave ratio of approximately 2:1 throughout a segment of the above-identified frequency band (namely, from approximately 450 MHz to approximately 1.05 GHz) and an unacceptably higher voltage standing wave ratio through the remainder of the above-identified frequency band. This lack of impedance matching results in significant signal degradation upon distribution, which is highly undesirable.

Figure 9A:
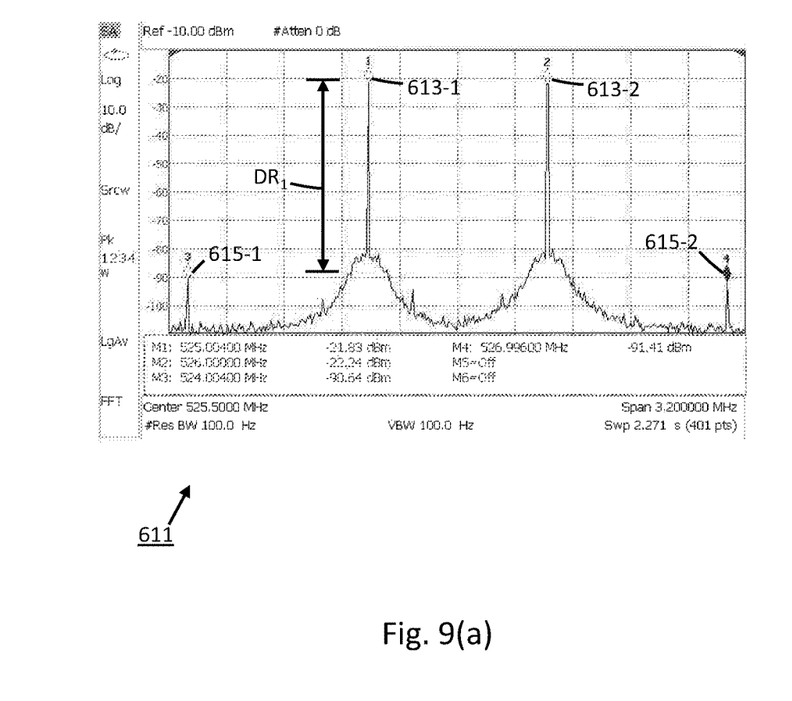
FIGS. 9(a) and 9(b) are graphs of actual measurements of the output signal produced in response to the injection of a common two-tone input signal into each of the antenna distribution unit shown in FIG. 4 and a conventional antenna distribution unit of the type shown in FIG. 2, respectively, the graphs together illustrating the improvement in spurious free dynamic range that is achieved by the present invention.
Figure 9B:
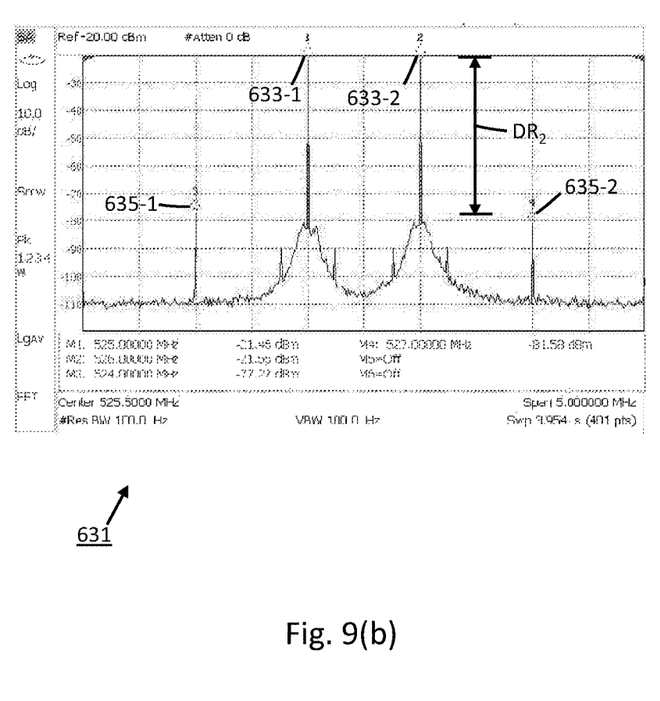

FIGS. 9(a) and 9(b) are actual graphs which illustrate the spurious free dynamic range measured in both antenna distribution unit 117 and the comparative unit, respectively. Together, the aforementioned graphs illustrate a significant improvement in the spurious free dynamic range that is achieved by the present invention.

Specifically, in FIG. 9(a), a graph for antenna distribution unit 117 is shown, the graph being identified generally by reference numeral 611. In graph 611, a first tone 613-1 and a second tone 613-2 are input into unit 117 at 525 MHz and 526 MHz, respectively (i.e. spaced 1 MHz apart) and measured at an output port of unit 117, with graph 611 representing tones 613 in terms of input signal power (dBm) in view of frequency (MHz). Nonlinear aspects of antenna distribution unit 117 generate intermodulation distortion (IMD) products 615-1 and 615-2. Accordingly, a spurious free dynamic range, $DR_1$, of approximately 70 db can be measured for antenna distribution unit 117 by calculating the difference in signal power between input tones 613 and IMD products 615.

By comparison, in FIG. 9(b), a graph for the comparative unit is shown, the graph being identified generally by reference numeral 631. In graph 631, a first tone 633-1 and a second tone 633-2, identical in nature to tones 613-1 and 613-2, are input into the comparative unit and measured at one of its output ports. As can be seen, the comparative unit generates IMD products 635-1 and 635-2 of significantly greater signal power. Consequently, a spurious free dynamic range, $DR_2$, of approximately 55 db can be measured for the comparative unit by calculating the difference in signal power between input tones 633 and IMD products 635, this dynamic range being considerably lower than the dynamic range achieved by unit 117.

The invention described in detail above is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. An antenna distribution unit for distributing an input radio frequency (RF) signal to a plurality of electronic devices, the input RF signal comprising two or more discrete antenna feeds, the antenna distribution unit comprising:
   (a) a single three-way splitter for splitting the input RF signal into first, second and third split signals as part of a first splitting stage; and
   (b) a splitter assembly coupled to the single three-way splitter, the splitter assembly comprising a set of three-way splitters for splitting each of the first, second and third split signals into three separate output signals as part of a second splitting stage.

2. The antenna distribution unit as claimed in claim 1 wherein the set of three-way splitters comprises a first three-way splitter for splitting the first split signal into a set of three output signals.

3. The antenna distribution unit as claimed in claim 2 wherein the set of three-way splitters comprises a second three-way splitter for splitting the second split signal into a set of three output signals.

4. The antenna distribution unit as claimed in claim 3 wherein the set of three-way splitters comprises a third three-way splitter for splitting the third split signal into a set of three output signals.

5. The antenna distribution unit as claimed in claim 4 further comprising an RF coupler coupled to the single three-way splitter for conditioning the input signal prior to the first splitting stage.

6. The antenna distribution unit as claimed in claim 5 further comprising a plurality of dual-port, output connectors coupled to the splitter assembly.

7. The antenna distribution unit as claimed in claim 6 wherein the plurality of output connectors together includes at least nine output ports, each output port adapted for connection to one of the plurality of electronic devices.

8. The antenna distribution unit as claimed in claim 1 wherein the antenna distribution unit comprises means for distributing the input RF signal within a usable frequency spectrum having a range from approximately 50 MHz to approximately 1000 MHz.

9. The antenna distribution unit as claimed in claim 8 wherein the antenna distribution unit comprises means for distributing the input RF signal within a usable frequency spectrum having a range in one of the group consisting of 50 MHz to 88 MHz, 175 MHz to 213 MHz, 470 MHz to 610 MHz, and 900 MHz to 1000 MHz.

10. The antenna distribution unit as claimed in claim 9 wherein the antenna distribution unit comprises means for distributing the input RF with a gain flatness in the range from −5 db to +5 db.

11. The antenna distribution unit as claimed in claim 10 wherein the antenna distribution unit comprises means for distributing the input RF signal with a spurious-free dynamic range of at least 70 db.

12. The antenna distribution unit as claimed in claim 11 wherein the antenna distribution unit comprises means for distributing the input RF signal with a third-order intercept point of no greater than 20 db.

13. The antenna distribution unit as claimed in claim 12 wherein the antenna distribution unit comprises means for distributing the input RF signal with a voltage standing wave ratio of no greater than 1.5:1.

\* \* \* \* \*